(12) United States Patent
Kroepfl (10) Patent No.: US 10,178,145 B2
(45) Date of Patent: Jan. 8, 2019

(54) METHOD FOR ADJUSTING A DATA STREAM TO BE TRANSMITTED TO A RESOURCE LOAD

(71) Applicant: VISOCON GMBH, Graz (AT)

(72) Inventor: Andreas Kroepfl, Graz (AT)

(73) Assignee: EYESON GMBH, Graz (AT)

( * ) Notice: Subject to any disclaimer, the term of this patent is extended or adjusted under 35 U.S.C. 154(b) by 0 days.

(21) Appl. No.: 15/518,372

(22) PCT Filed: Oct. 19, 2015

(86) PCT No.: PCT/EP2015/074185
§ 371 (c)(1),
(2) Date: Apr. 11, 2017

(87) PCT Pub. No.: WO2016/059257
PCT Pub. Date: Apr. 21, 2016

(65) Prior Publication Data
US 2018/0131746 A1    May 10, 2018

(30) Foreign Application Priority Data
Oct. 17, 2014  (DE) .................. 10 2014 115 188

(51) Int. Cl.
*H04N 7/15* (2006.01)
*H04L 29/06* (2006.01)
(Continued)

(52) U.S. Cl.
CPC ............. *H04L 65/80* (2013.01); *G06Q 30/02* (2013.01); *G06T 5/002* (2013.01); *H04H 20/42* (2013.01);
(Continued)

(58) Field of Classification Search
CPC .......... H04N 7/15; H04N 7/152; H04N 7/147; H04L 65/80; H04L 47/38; H04L 47/828; H04L 47/801; H04L 65/4038; G06T 5/002
(Continued)

(56) References Cited

U.S. PATENT DOCUMENTS 8,909,763 B2 * 12/2014 Komeda ............... G06F 9/5083
                                                                709/204
8,990,351 B2    3/2015 Isaksson
(Continued)

FOREIGN PATENT DOCUMENTS

DE       112012001770       1/2014
EP         2498491 A1       9/2012
WO     WO 2014/046852 A1    3/2014

OTHER PUBLICATIONS

English translation of the International Preliminary Report on Patentability, dated Apr. 27, 2017.
(Continued)

*Primary Examiner* — Stella L. Woo
(74) *Attorney, Agent, or Firm* — Dority & Manning, P.A.

(57) ABSTRACT

In a method for adjusting data streams during a video conference the audio-based and video-based real-time communication to be transmitted to various receiver units with respective resource loads that vary over time, a server unit receives an incoming data stream from each of a multiple number of transmitter units. The server unit generates from such incoming data streams a multiple number of outgoing data streams, each having a different compressed data rate. The server unit receives from the specified receiver units, their resource loads (varying over time) in chronological intervals and accordingly subjects the data rates of the compressed outgoing data streams to a controlling adjustment to the resource loads of the respective specified
(Continued)

receiver units. The outgoing data streams so adjusted are sent to the specified receiver units.

1 Claim, 3 Drawing Sheets (51) Int. Cl.
*H04N 21/637* (2011.01)
*H04L 12/811* (2013.01)
*H04L 12/911* (2013.01)
*H04L 12/825* (2013.01)
*G06Q 30/02* (2012.01)
*H04N 21/442* (2011.01)
*H04N 21/658* (2011.01)
*H04H 20/42* (2008.01)
*H04H 20/82* (2008.01)
*G06T 5/00* (2006.01)
*H04L 12/927* (2013.01)
*H04N 7/14* (2006.01)

(52) U.S. Cl.
CPC ........... *H04H 20/82* (2013.01); *H04L 47/263* (2013.01); *H04L 47/38* (2013.01); *H04L 47/781* (2013.01); *H04L 47/801* (2013.01); *H04L 47/828* (2013.01); *H04L 65/403* (2013.01); *H04L 65/4038* (2013.01); *H04L 65/4092* (2013.01); *H04N 7/147* (2013.01); *H04N 21/44222* (2013.01); *H04N 21/637* (2013.01); *H04N 21/6582* (2013.01)

(58) Field of Classification Search
USPC .............................. 348/14.08, 14.09, 14.12
See application file for complete search history.

(56) References Cited

U.S. PATENT DOCUMENTS

| | | | |
|---|---|---|---|
| 2002/0114285 A1 | 8/2002 | LeBlanc | |
| 2003/0041165 A1 | 2/2003 | Spencer et al. | |
| 2007/0263824 A1 | 11/2007 | Bangalore et al. | |
| 2008/0101410 A1* | 5/2008 | Barkley | H04L 12/66 |
| | | | 370/473 |
| 2010/0149301 A1 | 6/2010 | Lee et al. | |
| 2013/0208080 A1* | 8/2013 | Lukasik | H04N 7/15 |
| | | | 348/14.09 |
| 2014/0365620 A1* | 12/2014 | Lindberg | H04L 65/60 |
| | | | 709/219 |
| 2016/0134837 A1* | 5/2016 | Xiao | H04N 7/148 |
| | | | 348/14.12 |

OTHER PUBLICATIONS

German Search Report, dated May 25, 2015.
International Search Report (PCT/EP2015/074185), dated Jan. 13, 2016.

* cited by examiner

METHOD FOR ADJUSTING A DATA STREAM TO BE TRANSMITTED TO A RESOURCE LOAD

FIELD OF THE INVENTION

The present invention relates to a method for adjusting a data stream to be transmitted to the respective resource load of various first receiver units, in particular for audio-based and video-based real-time communication.

A quality adjustment based on real-time processing capability is known from DE 11 2012 001 770 T5. Therein, the quality of a media stream transmitted to a client device is dynamically adjusted on the basis of the real-time availability of resources on the client device. Central processing unit resources, memory availability, buffer utilization, utilization of the graphics processing unit, etc. are continuously monitored in order to evaluate the ability of a device to handle media streams of certain quality levels. If it is determined that resources on a client device are temporarily not able to handle a high quality media stream, a stream of lower quality is selected and transmitted to the client device, without having to open a new session. A disadvantage in this case is that the quality adjustment of a media stream, on the one hand, is carried out only relatively slowly. On the other hand, the disclosed method is only solely designed to adjust a media stream to the available resources of an individual device.

WO 2014/046852 discloses a similar method for transmitting video streams to output devices.

Furthermore, EP 2 498 491 A1 discloses a method and a device for audio-based and video-based real-time communication between at least one master participant and a multiple number of subgroup participants. Thereby, the number of participants is almost unlimited, whereas the possibility of bidirectional communication should be present at the same time. The disadvantage of this method is that the available bandwidths of the group participants are not taken into account.

SUMMARY OF THE INVENTION

The task of the present invention is to provide a method that better addresses the available resources of participants, in particular participants in a video conference, in order to improve the quality of a data transmission. A corresponding device is also to be proposed.

The task is solved by a method and a server unit for adjusting a data stream to be transmitted to a resource load as described more fully below.

The invention generally relates to a method or a device for adjusting data streams to be transmitted to the respective resource load of various first receiver units (in particular with respect to their bandwidth), in particular in the case of audio-based and video-based real-time communication within the framework of a video conference, preferably over the Internet. The specified adjustment is carried out by one or more correspondingly designed computer programs or software programs.

A server unit receives an incoming data stream from at least one transmitter unit, preferably one incoming data stream from each of a plurality of transmitter units. In doing so, with real-time communication, one transmitter unit is allocated to, for example, one participant in a video conference. The participant has a recording device, such as a webcam and a microphone which generates the data stream to be transmitted to the server unit.

More preferably, at least some of the participant devices of the participants feature at least one transmitter unit for transmitting data streams to the server unit (referred to herein as "incoming data streams," since they are received by the server) and one receiver unit for receiving the data streams transmitted by the server device (referred to herein as "outgoing data streams," since they originate from the server). It is preferred if a receiver unit, which is designated here as a "first receiver unit," is a component of such a participant device; thus, a participant in a video conference (who is then referred to as "active") is allowed to transmit and receive data streams within the framework of the video conference. Thus, if a first receiver unit is mentioned within the framework of this publication, this preferably refers to a receiver unit, which is available to an active participant in a video conference, as part of a participant device that also comprises a transmitter unit.

By contrast, passive participants in the video conference do not need a transmitter unit, but merely a receiver unit, which is referred to herein as an "additional, second receiver unit" or simply a "second receiver unit." The second receiver units also preferably transmit their respective current resource loads to the server unit.

However, the terms "first receiver unit" and "second receiver unit" are not limited to the aforementioned structure. For example, in the case of a sufficient number of available outgoing data streams, a "first" receiver unit can also be allocated to each passive participant, with which a controlling adjustment of the data rate of the associated data stream according to claim 1 is also carried out.

The server unit comprises means for receiving the at least one incoming data stream, which is formed, in particular, as an interface to the Internet, if the incoming data stream is received over the Internet. The interface may be a WLAN (wireless local area network), a LAN or the like.

By means of correspondingly programmed software, the server unit generates from the incoming data stream a plurality of outgoing data streams, preferably of the same content (video and audio contents), but with—at least for some of the receiver units—different compressed data rates under a dynamic adjustment to the respective resource load of the various first receiver units (and if applicable, second receiver units; see below). In doing so, a data rate is to be understood as a specific value of information units per time unit, which is usually specified in kbit/s or mbits/s (kilobits per second or megabits per second). In general, the data rate is a measure of the quality or the information content of a data stream. With a higher data rate, more information can be transmitted and/or processed during the same time. At a video conference, the quality of the video and/or audio information increases with the data rate; that is, with a higher data rate, more images per second, a higher number of pixels and/or more colors can be transmitted. Therefore, it is preferred if a receiver unit receives a data stream that has the highest possible data rate.

For example, two outgoing data streams with a data rate of 384 kbit/s and 2.5 mbits/s are generated in the server unit from an incoming data stream. Of course, it is also possible to generate significantly more outgoing data streams with significantly higher and/or lower data rates.

Subsequently, the outgoing data streams are sent to the receiver units through correspondingly established transmission channels, which are familiar to a skilled person. Since, in general, different receiver units feature different resource loads, it is advantageous to provide a receiver unit with a higher resource load with an outgoing data stream that features a lower data rate, such that this receiver unit can also process the outgoing data stream. In the event that a receiver unit features a lower resource load (that is, more resources are available), an outgoing data stream with a higher data rate is advantageously sent to such receiver unit. In the case of a video conference, the receiver units are allocated to a plurality of participants who follow the video conference. It is also conceivable that one or more receiver units are recording devices, which receive the outgoing data stream for subsequent purposes. The receiver units feature corresponding software, in order to evaluate their resource load and provide this information to the server unit.

In accordance with the invention, the server unit receives, at least from some first receiver units, its resource loads (varying over time) in chronological intervals, and adjusts the data rates of the compressed outgoing data streams to the respective specified first receiver units. As will be explained further below, an adjusted data stream can also be allocated to second receiver units, which are preferably used by passive participants in a video conference.

By means of the controlling adjustment of the data rates of the compressed outgoing data streams on the basis of the resource loads (varying over time) of the individual receiver units, an optimum data transmission can be achieved for all participants in the video conference. All participants see and hear the same content at the same time, but typically with varying resolution. Thus, an individual adjustment of the data rates to the respective resource load of the receiver units can be accomplished.

In accordance with a particularly preferred embodiment, the controlling adjustment is achieved with the inclusion of a precalculation of the expected resource loads of at least some of the first receiver units. This is accomplished by the server unit, from the specified information regarding the resource loads varying over time, which it receives at least from some of the specified first receiver units in chronological intervals, precalculating the expected resource loads of such first receiver units, and, accordingly, adjusting the data rates of the compressed outgoing data streams. Through the precalculation of the resource load, a more rapid and optimal (that is, sufficiently precise) adjustment of the data rates of the outgoing data streams to the resource load of the first receiver units is achieved. For example, an increasing resource load with a first receiver unit is detected by its information sent to the server unit, and is already precalculated for a subsequent point in time. Accordingly, the outgoing data stream for this first receiver unit can then be compressed to a lower data rate. An example of such precalculation, namely an exponential smoothing method, will be described in more detail.

The precalculation, which represents an estimation of resource loads of the receiver units to be expected in the future, provides a more precise way to adjust to the requirements of the data streams outgoing from the server unit.

The resource load can relate to the reception bandwidth and/or to the load of a processor and/or a memory device of the respective first receiver unit. In general, a processor determines the processing speed of a data stream. Moreover, such a processor, which processes only the graphics information of a data stream, can be arranged in a graphics processing unit of the receiver unit.

A high resource load (that is, the availability of only a small amount of resources) results in a restriction or impairment in real-time communication, since (for example, based on the low bandwidth), the outgoing data stream cannot be fully transmitted or received in real time, or because, for example, the processor is not able to process the size of the outgoing data stream. This would lead, for example, to the video information not being displayed in a fluid manner in a receiver unit during a video conference.

Furthermore, it is advantageous if the different data rates are generated by different resolutions, color depths, image repetition rates and/or compression codec. In turn, using the example of a video conference, the easiest way to reduce the data rate is by reducing the image repetition rate. Another option for reducing the data rate is to decrease the color depth. Instead of a colored video conference, the video conference is represented, for example, only in black/white. A lower resolution can also be selected. In addition, one or another compression codec can be used. A compression codec is a rule for encoding (compressing) and decoding (decompressing) a data stream. Thus, the data rate can be additionally reduced when selecting the appropriate compression codec.

It is particularly advantageous if at least two incoming data streams containing a video signal and originating from different transmitter units are combined in the server unit into a combined data stream, in particular a mosaic image, whereas this combined data stream is then transmitted to the specified receiver units in the form of a plurality of outgoing data streams with respectively adjusted data rates. Thus, in the case of a video conference, a plurality of participants can be displayed in one video image. A participant with a receiver unit that receives this combined outgoing data stream then sees a plurality of participants in the video stream, and can thus determine their responses and, if appropriate, address them.

An additional advantage is that—as already stated above—at least one participant device, in which one specified transmitter unit and one specified first receiver unit are integrated, is provided. In doing so, with his participant device, the participant in a video conference can send a data stream (for example, an image sequence of himself, a presentation that he shows, etc.) to the server unit and view on his screen, in the compressed (outgoing) data stream received by the server unit, preferably both contributions of the other participants and his own content transmitted to the server unit, in the form of a mosaic image. Such a participant is also referred to as an "active participant."

Preferably, the data streams of all active participants in a video conference are combined in the server unit into a mosaic image, which is then transmitted to the active participants in the video conference—and preferably also its passive participants—as one combined data stream with the same content (including the audio contents) but with different compressed data rates. This means that all participants receive the same image and the same sound, thus the same content, but with different quality.

It is advantageous if the data rates of outgoing data streams are given a predefined value prior to the commencement of the adjustment, and if the values of at least one outgoing data stream, preferably of all the first outgoing data streams allocated to the first receiver units, is modified successively and iteratively in the course of time on the basis of the information obtained concerning the resource loads. Such a predefined value can also be referred to as a starting value. Thereby, it may be sensible if the predefined values are graduated, such that, to the extent possible, all possible bandwidth ranges are evenly covered. For example, the gradation could be formed in such a manner that, with five outgoing data streams, the stages are 500 kbit/s, 1,000 kbit/s, 1,500 kbit/s, 2,000 kbit/s and 2,500 kbit/s. Thus, the bandwidth range of 500 kbit/s to 2500 kbit/s is evenly covered. However, by no means must a gradation be equidistant.

If the number of data streams outgoing from the server is at least as large as the number of first receiver units—which are preferably integrated, together with one transmitter unit, into a participant device for active participation in a video conference—an outgoing data stream is preferably allocated to each such first receiver unit. Such allocation, which preferably takes place, in the case of a video conference, with relatively few active participants (for example, up to ten active participants), can be undertaken prior to a controlling adjustment of the data rate, whereas the actual initial values with respect to resource load, on the one hand, and data rates of the outgoing data streams, on the other hand, are preferably not taken into account. Such allocation is a 1:1 allocation of the first receiver units to a respective outgoing data stream. Such 1:1 allocation will be discussed below.

In accordance with one alternative, which may preferably be implemented as an addition to the above 1:1 allocation within the method according to the invention, but for different conditions, each receiver unit—preferably as part of a participant device of an active participant—"seeks out" that data stream, the initial data rate value of the resource load of which comes closest to the specified first receiver device. Such a procedure is appropriate if a large number of active participants in a video conference above a predetermined maximum number (for example, more than ten) is present. In this case, it is preferable that an initial allocation, for example a 1:1 allocation, is not undertaken. Rather, the first receiver units preferably seek out the data stream that is closest to its current resource load, the data rate of which is then subjected to a controlling adjustment, in particular by means of an exponential smoothing method, as described further below.

Situations may arise with which the number of available data streams through the corresponding transmission channels is less than the number of active participants with their respective first receiver units (independently of the actual number; that is, independently of whether it is a smaller video conference (up to a predefined maximum number of active participants, for example of up to ten active participants, or a larger video conference, for example, of more than ten active participants)). For example, an allocation of a plurality of first receiver units to one of the data streams can be undertaken. In doing so, the relative proximity of the respective resource load of the individual first receiver units to the various data streams with their respective data rates can be taken into account. For example, if, for five available data streams, eight participants actively participate in a video conference with their respective first receiver units, three of such first receiver units may be allocated with a common data stream and two other first receiver units may be allocated with a different common data stream; the other three first receiver units are then allocated with one of the data streams that is still remaining. If a data stream is transmitted to a plurality of first receiver units, such data stream can be adjusted, for example, to a mean value (possibly including weighting factors) of the corresponding resource loads of the first receiver units.

Following the initial allocation or the allocation that takes place after selection, as described above, each of the outgoing data streams allocated to the first receiver units is modified on the basis of the information obtained regarding the resource loads of the first receiver units, in order to respond to the resource load of such first receiver units.

Furthermore, it is advantageous if, after the end of a transmission of an outgoing data stream to a first receiver unit, the data rate of the outgoing data stream returns again to a predefined respective value that may be obtained prior to the adjustment. Upon the next transmission (to another or even the same receiver unit), a compression or, generally, an adjustment of the data rate is started again from this predefined value.

In accordance with one advantageous embodiment, in the course of the adjustment, one other outgoing data stream is transmitted, at least once, to at least one first receiver unit, which receives a certain outgoing data stream. Such a transmission, which prevents the data rates of the data streams from having to cover a very large value range, can be implemented, in particular, in one or more of the following cases:

1) The difference of the current resource load of the specified first receiver unit to a current data rate of another outgoing data stream is less than the difference of such resource load to the data rate of the outgoing data stream currently allocated to such receiver unit.
2) Based on the specified adjustments, the current data rate of an outgoing data stream reaches the current data rate of another outgoing data stream.
3) The current resource load of such first receiver unit reaches the current resource load of another first receiver unit, to which the specified other outgoing data stream is allocated.
4) The current resource load of one of the specified first receiver units reaches the current data rate of another outgoing data stream.

In accordance with one advantageous embodiment, the other outgoing data stream is transmitted to at least two first receiver units initially receiving a specific outgoing data stream in the course of the adjustments. In this manner, an efficient individual adjustment of the data streams can be undertaken. The specified method step is advantageous, for example, if the respective resource load of the two first receiver units develops towards the current data rate of the outgoing data stream allocated to the respective other first receiver unit.

The values of the data rates preferably relate to video formats, for example according to CIF (Common Intermediate Interface), PAL (Phase Alternating Line), NTSC format (National Television Systems Committee) and/or HDTV (high-definition television). The CIF and PAL video formats are, for example, designed for transmission at relatively low data rates, and the HDTV video format is designed for higher data rates. Of course, other video formats, such as the so-called 4K or 8K UHDTV (ultra-high-definition television) video formats, are possible.

It is particularly advantageous if the specified controlling adjustment and, in particular, the specified precalculation are carried out using a successive approximation method. As a result, on a continuous basis or in specified chronological intervals, the data rate of an outgoing data stream is iteratively adjusted to the current resource load received successively by a respective first receiver unit.

It is also advantageous if the specified—preferably successive—precalculation is carried out using an exponential smoothing method, possibly together with an additional algorithm. The advantage of such a method is, in particular, that the adaptation or controlling adjustment relates to a value estimated for the future with respect to resource load. Thus, the adjustment does not always run "behind," but can be matched to a future estimated value.

Exponential smoothing is mentioned as an example of an exponential smoothing process. Exponential smoothing is usually based on a recursive formula such as the following:

$$y^*_t = \alpha y_t + (1-\alpha) y^*_{t-1}$$

In this formula, the parameter $y_t$ stands for the information sent by the first receiver units to the server unit with respect to the actual resource loads at point in time t, which chronologically varies. The parameter $y^*_{t-1}$ is the value (smoothed estimated value) precalculated for the previous period of the resource load of a first receiver unit, thus corresponding to the value calculated in the previous "loop." The parameter $y^*_t$ is the value (smoothed estimated value) for the precalculated expected resource load of this first receiver unit. The parameter α is a smoothing factor, which is in an interval between 0 and 1.

Assuming the recursive formula for the steps t=1 and t=2, t=2 and t=3, etc., and inserting the respective formulas into each other, the following generalized formula is obtained:

$$y_t^* = (1-\alpha)^t y_0^* + \sum_{n=0}^{t-1} \alpha(1-\alpha)^n y_{t-n}$$

This shows what behavior occurs for smoothing factors a close to zero and close to one. For a smoothing factor a close to zero (for example, 0.1), the first term (before the sum) is weighted more heavily; that is, a precalculated value will only deviate very slowly from a starting value $y^*_0$. By contrast, a smoothing factor α close to 1 (for example, 0.9) will more strongly weight a value y that is last precalculated. Thus, a higher smoothing factor leads to a more rapid adjustment of the data rates of the outgoing data streams to the resource load of the first receiver units.

It may thereby be sensible to keep the value of the smoothing factor constant from the outset; that is, at a predetermined value. Alternatively, however, the smoothing factor could also be varied during real-time communication. This may be sensible if the resource load of a first receiver unit remains approximately constant over a longer period of time. Then, a lower value for the smoothing factor can be passed. If, on the other hand, the value of the smoothing factor can be raised during the data rate adjustment, in a time period in which the resource load changes more rapidly than expected.

In addition, for some situations, it may be sensible to address the so-called "trends" in the resource load. With one trend, the circumstance that the resource load continuously decreases or increases in a longer time interval is designated. Then, it may be sensible to carry out a so-called "exponential smoothing of the second order." With this method, the trends are taken into account, and a particularly rapid adjustment of the data rates of the outgoing data streams to the resource load of the first receiver units is possible.

Advantageously, the first and preferably also the second receiver units send their respective resource loads to the server unit in those time intervals in which the respective resource loads change. The information of the resource load is only sent if the resource load actually changes.

Likewise, it may be advantageous if the first and preferably also the second receiver units send their respective resource load to the server unit at regular or varying time intervals, for example from 0.5 s to 20 s, in particular from 1 s to 15 s. Thus, a continuous adjustment of the data rates of the outgoing data streams to the resource load of the first and preferably also the second receiver units is realized.

If a fixed number of compressed outgoing data streams is provided with preferably respectively various data rates and various predefined values, a high or even excessive resource load of the server unit itself can advantageously be prevented. In the case of an unlimited number of outgoing data streams, even with the server unit, limits with the resources would be reached. Therefore, the number of outgoing data streams is advantageously determined; however, this can, of course, be different from server unit to server unit.

As already briefly described above, it is particularly advantageous if a 1:1 allocation is undertaken between each first receiver unit and exactly one, in each case varying, compressed outgoing data stream. Such an allocation is particularly suitable for a relatively small video conference with a predefined maximum number of active participants, for example up to ten active participants, whose respective participant device integrates a first receiver unit and a transmitter unit. In this case, each outgoing data stream can be adjusted to the respective bandwidth of the allocated first receiver unit of the respective participant, as will be explained in more detail below. The receiver units—in this case referred to as "second receiver units"—of passive participants in the video conference preferably do not experience a 1:1 allocation. However, this is preferably suitable if data streams that are not required for a 1:1 allocation with first receiver units are still present. In this case—to the extent that "free" data streams are present—a 1:1 allocation can also be undertaken for such second receiver units. As a rule, however, it is preferably provided that the additional, second receiver units—without an allocation, in particular a 1:1 allocation—select that outgoing data stream, the data rate of which is closest to their bandwidth.

The 1:1 allocation is also referred to as a 1:1 mapping; that is, a certain number of data streams is seen alongside an equal number of (first) receiver units. It is immediately apparent that, at each point in time, exactly one outgoing data stream is assigned to each first receiver unit at a data rate that is adjusted solely to its resource load. Each data rate of an outgoing data stream need only be adjusted to a single receiver unit. For example, with an increasing resource load (that is, the receiver unit has fewer resources available), the data rate of the data stream is adjusted in such a manner that the data rate of the outgoing data stream drops. However, this structure does not rule out different data streams being allocated to the first receiver units at different times; that is, a transmission of data streams takes place.

Of course, the resource load of the receiver unit can also be precalculated here, in order to obtain the most rapid possible adjustment of the data rate of the outgoing data stream to the resource load. This occurs, for example, by means of the aforementioned exponential smoothing. For this purpose, the first receiver unit sends the current "status" of its resource load to the server unit, which then calculates the expected resource load of such first receiver unit and accordingly adjusts the data rate of the outgoing data stream. This process is repeated continuously until the server unit or a first receiver unit terminates the real-time communication.

This 1:1 allocation may also take place only temporarily, as will be explained in the following. As a simple example, assume that two outgoing data streams a and b and two first receiver units c and d are present. The receiver unit c has a bandwidth of 500 kbit/s. The actual bandwidth may fluctuate around this value, but is advantageously precalculated by means of exponential smoothing, and the data rate of the outgoing data stream a is adjusted thereto. The same applies to the receiver unit d, which features a bandwidth of 900 kbit/s. Here, the data rate of the outgoing data stream b is adjusted. In one scenario, it may occur that the bandwidth of the receiver unit c increases up to a value above 900 kbit/s, e.g. 1200 kbit/s. It is then advantageous if, in the event of a convergence of the two bandwidths of the receiver units c and d, the data streams are respectively transmitted. That is, the outgoing data stream a with an initial value of the data rate of 500 kbit/s initially increases with the available bandwidth of the receiver unit c. If the value of the data rate of the outgoing data stream a has received 900 kbit/s, the data streams switch receiver units. The outgoing data stream b is then assigned to receiver unit c. Since b is adjusted to 900 kbit/s, this data rate of the outgoing data stream b then continues to increase up to 1200 kbit/s. The outgoing data stream a with a data rate of 900 kbit/s can then remain at such level, since the receiver unit d has only this bandwidth available. The same occurs, of course, upon a drop in one bandwidth or for more than only two first receiver units and/or outgoing data streams. The advantage of this aspect of the method is that the data rates of the respective outgoing data streams must therefore only be varied in a smaller range. This saves resources in the server unit.

If an additional, second receiver unit is added, which is or will be allocated to an outgoing data stream by means of a 1:1 allocation, such receiver unit is preferably allocated with an outgoing data stream, the data rate of which is closest to the available resource load with respect to the data rate. Additional (second) participants are passive participants suitable for a video conference who are simply watching the video conference without providing their own contributions; therefore, such passive participants do not need to have their own transmitting unit. In order to accomplish the specified assignment, this additional, second receiver unit provides feedback to the server unit regarding its currently available bandwidth. From this information, in each case, the server unit preferably calculates the difference from each of the available outgoing data streams and from this—in order to avoid negative signs—the corresponding amount of such differences. The additional receiver unit is preferably then assigned with the outgoing data stream that has the smallest difference from the additional receiver unit. This can also take place in particular for several additional, second receiver units, and is preferably carried out continuously, or at least in time intervals. Such allocation from an additional receiver unit to an outgoing data stream is not necessarily constant; rather, a second receiver unit can advantageously switch to another outgoing data stream, if the associated difference has become smaller. The same data stream can also be allocated to a plurality of second receiver units.

The aforementioned method is particularly suitable for a relatively "small" video conference with a predefined maximum number of active participants, for example ten or less active participants. With such a video conference, it is accordingly preferred that a 1:1 allocation is undertaken for the first receiver units of the active participants, whereas, at any point in time, each of such first receiver units is allocated with exactly one data stream, the data rate of which is adjusted in accordance with the invention. Each of the second receiver units of the passive participants preferably selects the data stream nearest to it with respect to its respective resource load.

An advantageous embodiment provides that the compressed outgoing data streams are sent to the specified additional, second receiver units without being adjusted. This saves computing resources on the side of the server unit, which can be used to adjust other outgoing data streams.

An alternative advantageous additional form of the invention provides, on the other hand, that the outgoing data streams of second receiver units, which do not undergo a 1:1 allocation, are adjusted by at least one additional algorithm in such a manner that a common approximated optimum value for the data rates of the outgoing data streams is determined. In this case, it is advantageous if, with the specified additional algorithm for calculating an approximate optimum value, various second receiver units and/or at least one outgoing data stream with the corresponding predefined value for the data rate are given a specific weighting factor, by means of which the approximate optimum value is calculated by the server unit. For example, with two additional, second receiver units, the data rate of the outgoing data stream is adjusted to a mean value arising from the two resource loads, in particular bandwidths, of two such receiver units. In doing so, there are different ways to calculate such mean value. Upon a calculation of the arithmetic mean, both second receiver units are each weighted with a weighting factor of 0.5. The sum of the individual weighting factors must always be 1.

An additional possibility is that the predefined value described above is also received in the specified adjustment. For example, an arithmetic mean of the two available resources (for example, bandwidths) and the predefined value can be formed. Thus, each of the three weighting factors features a value of ⅓.

It is also possible for the weighting factors to be different from one another. Thus, it is conceivable that the data rate of an outgoing data stream is adjusted closer to one of, for example, two second receiver units, for example, to the receiver unit that was closer to the predefined value from the outset.

For example, the weighting factors could be 0.6, 0.1, and 0.3. Furthermore, assume, for example, that the bandwidth of a receiver unit A (weighting factor of 0.6) is 1000 kbit/s, of a receiver unit B (weighting factor of 0.1) is 500 kbit/s and of the predefined value (weighting factor of 0.3) is 700 kbit/s. Then, with the specified weighting factors, a data rate of the outgoing data stream of 860 kbit/s ([1000*0.6+ 700*0.3+500*0.1] kbit/s) is obtained. An additional weighting factor is added to each additional receiver unit. It is also conceivable that a weighting factor of a second receiver unit is set at "zero." Then, the adjustment of an outgoing data stream to such receiver unit is not necessary. Instead, such receiver unit is advantageously assigned with an outgoing data stream, the data rate of which is designed for the available bandwidth of the second receiver unit. Preferably, an outgoing data stream is assigned with a data rate that is below an available bandwidth of the receiver unit, in order to be able to receive and/or process the outgoing data stream without any interference with such receiver unit.

The aforementioned different variants are suitable, for example, if passive participants want to follow a video conference for which a 1:1 allocation is not provided or is not sensible.

With a large number of passive participants, in particular with larger video conferences (with active participants above a predefined number), the data streams outgoing to them are preferably adjusted with respect to their data rate to one of a possible plurality of remaining constant target values (a maximum number of target values can be provided as data streams for such adjustment). For the second receiver units of the passive participants with respect to the data rates of the outgoing data streams, such target value(s) preferably lie outside a range that has been defined for the data streams at the first receiver units of the active participants. Such a range may also be referred to as a range of the core conference, in which only active participants are allowed.

More preferably, the method in accordance with the invention comprises both of the functionalities described above; that is, on the other hand, a functionality as described for relatively small video conferences with a predefined maximum number P of active participants (for example, up to ten participants) and, on the other hand, a functionality as described for larger video conferences with a number of active participants of more than P (thus, in the example specified above, more than ten active participants).

For smaller video conferences, the following preferably applies:

N active participants (whereas N≤P) with first receiver units are provided with data streams, preferably at least N data streams, with corresponding N transmission channels;

An allocation, preferably a 1:1 allocation, of the N participants to the data streams is undertaken;

The specified data streams are subject to a controlling adjustment to the resource loads of the respective first receiver units; and The second receiver units of additional passive participants are allocated to the data stream that is next to them with respect to its resource load.

On the other hand, the following preferably applies for larger video conferences:

K active participants (whereas K>P) with first receiver units are provided with data streams, at least M<=K data streams, with corresponding M transmission channels;

The first receiver units of the K active participants are allocated with the data stream closest to them in terms of their resource load;

Such data streams are subject to a controlling adjustment to the resource load of the respectively allocated first receiver unit of the respective participant in the K active participants; and The data rates of the remaining data streams are subject to a controlling adjustment to one or more constant target values, which is or are representative of all second receiver units of the passive participants.

With the regulating adjustments specified above, the exponential smoothing method described above is preferably used.

The invention also proposes a server unit, in particular for an audio-based and video-based real-time communication within the framework of a video conference, with a receiving device and a transmitting device along with at least one interface for receiving and/or transmitting data, with a processing unit and at least one memory unit. Thereby, the at least one interface for receiving and/or transmitting data is generally formed by a network card. Typically, a connection to the Internet through cable or a WLAN or to a local network is established by means of a network card. A processing unit normally comprises the processor of the server unit, by means of which the method for the controlling adjustment of the data rates of the compressed outgoing data streams to the respective first receiver units is carried out, preferably by precalculating its resource load. However, an operating system and all other processes relevant to the operation of the server unit are preferably also executed by this processor. The specified at least one memory unit is a storage medium customary in a server unit; for example, it includes hard disks or working memory. The software programs required for carrying out the method on the part of the server unit are stored in the memory unit. The incoming data streams can also be stored in the specified memory unit or another memory unit, including a working memory.

In particular, the server unit is preferably formed in such a manner that the functionalities specified above for smaller and larger video conferences are available.

The location of the server unit is largely arbitrary. If the server unit is connected to the Internet, this can be far away from the transmitter units and/or receiver units; in particular, the transmitter units, the receiver units and/or the server unit can be located in different countries. If, on the other hand, the real-time communication is restricted, for example, to one large company, the server unit can also be placed in a special server room of the company.

In accordance with the invention, the above-described method for adjusting a data stream to be transmitted to an existing resource load is carried out by means of the server unit on the basis of correspondingly programmed software, which is also part of the invention.

A computer program for a computer of a receiver unit is also a part of the invention. Such computer program includes, for example, the function of evaluating the resource load of the receiver unit and providing it to the server unit. The computer program product can be present on a medium (for example, a CD, a USB stick, etc.) or loaded directly into a memory device of the server unit or a receiver unit, for example over the Internet.

BRIEF DESCRIPTION OF THE DRAWINGS

Further advantages of the invention are described in the following embodiments. The following is shown.

DETAILED DESCRIPTION

Figure 1:
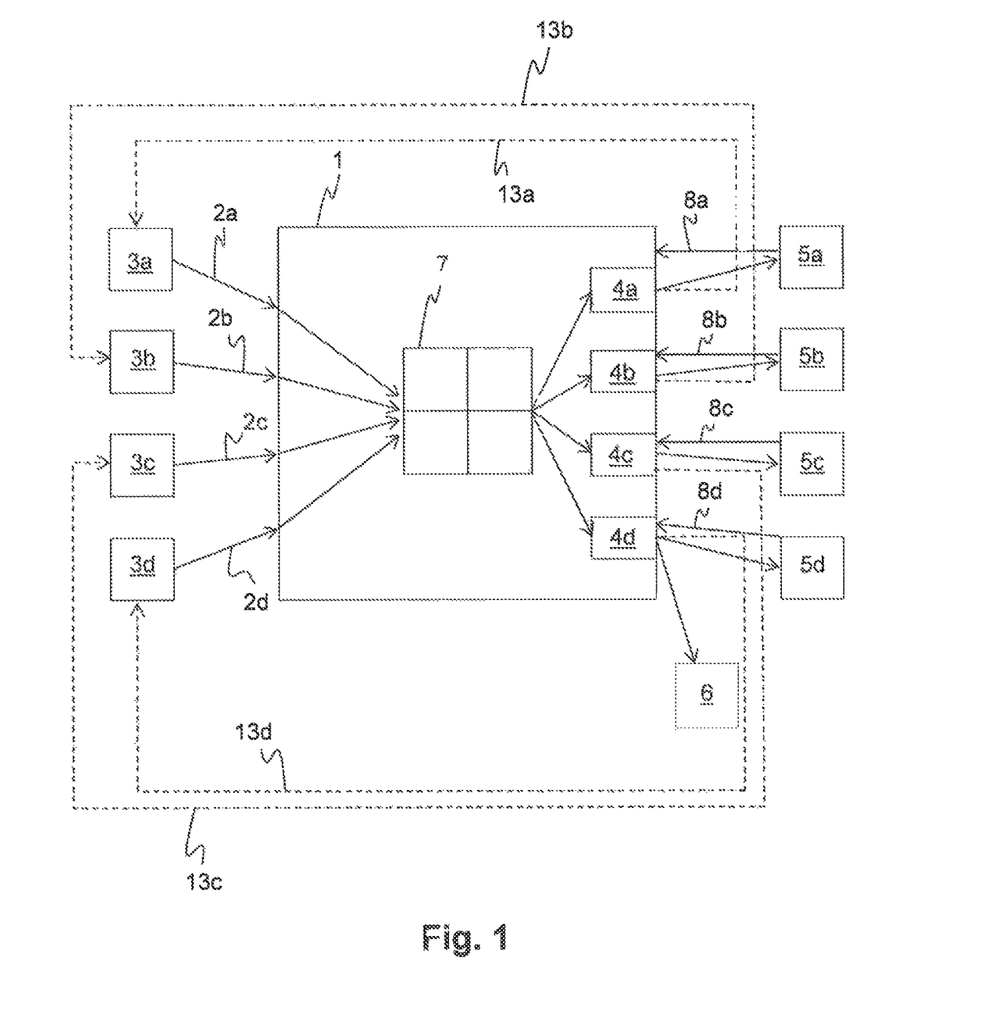
FIG. 1 a schematic representation of a method for adjusting a data stream to be transmitted with four different compressed outgoing data streams, FIG. 2 a data rate/time diagram of available resources of four first receiver units, FIG. 3 a data rate/time diagram for representing outgoing data streams adjusted with time, and FIG. 4 a data rate/time diagram with four outgoing data streams and one available bandwidth of a receiver unit.

FIG. 1 shows a schematic sequence of a software-assisted method for adjusting a data stream of computer program product to be transmitted, with four different compressed outgoing data streams 4*a-d*. Each of the four transmitter units 3*a-d* transmits an incoming data stream 2*a-d* with video signals, and preferably audio signals, to a server unit 1. In the server unit 1, the incoming data streams 2*a-d* are combined to form one mosaic image 7, which is subsequently compressed in the server unit 1 into four different outgoing data streams 4*a-d* with different data rates. The compressed outgoing data streams 4*a*, 4*b*, 4*c* and 4*d* are sent to the first receiver units 5*a*, 5*b*, 5*c* and 5*d*, respectively. Thus, the compressed outgoing data streams 4*a-d* and the first receiver units 5*a-d* each form a 1:1 allocation. This 1:1 allocation is suitable for a relatively small video conference with up to approx. ten active participants.

Each of the first receiver units has a computer program that calculates the resource load of the respective first receiver unit. Through data connections, preferably Internet-assisted data connections, each of the first receiver units 5*a-d* transmits information 8*a-d* regarding its resource load back to the server unit 1, after its calculation with the aid of the corresponding computer program in the respective first receiver unit 5*a-d*. From such information 8*a-d*, the data rate for each of the compressed outgoing data streams 4*a-d* is subject to a controlling adjustment by the server unit 1 for transmitting to the respective specified first receiver units 5*a-d*, preferably through the software-assisted precalculation of the resource load of the respective first receiver units 5a-d on the part of the server unit 1. For this purpose, the use of the exponential smoothing process described above is particularly preferred.

The dashed lines 13a-d indicate that the compressed data streams 4a-d (that is, the mosaic image 7 that is combined by the server unit 1) are also returned to the transmitter units 3a-d allocated to the receiver units 5a-d. Each of the transmitter units 3a-d is a part of a participant device (here, for the sake of clarity, not shown in a common housing or the like), in which the respective transmitter unit 3a, 3b, 3c and 3d and the respective first receiver unit 5a, 5b, 5c and 5d are contained. In the case of a video conference, the information sent by the other transmitter units 3a-d or, in the case of a video conference, the participants and/or their presentations and the like can also be viewed, for example, on a screen of the respective participant device of the active participants. The participant associated with this participant device can then respond to the other participants in a known manner by means of his or her transmitter unit 3a, 3b, 3c and 3d, for example if a question is asked. It is particularly preferred that all participants view the same image on the output devices, for example the screens, of their participant devices, irrespective of whether they are active or passive participants—but with at least partially varying qualities, which depend on the data rates of the respectively received outgoing data streams 4a-d.

It is also shown that an additional, second receiver unit 6 participates in the video conference. This second receiver unit 6, which is exemplary of one of the possible many passive participants in a video conference, is assigned with a compressed outgoing data stream 4d. Thereby, the data rate of the compressed outgoing data stream 4d is either not adjusted or adjusted to the resource load of the second receiver unit 6 in accordance with a method described above.

Figure 2:
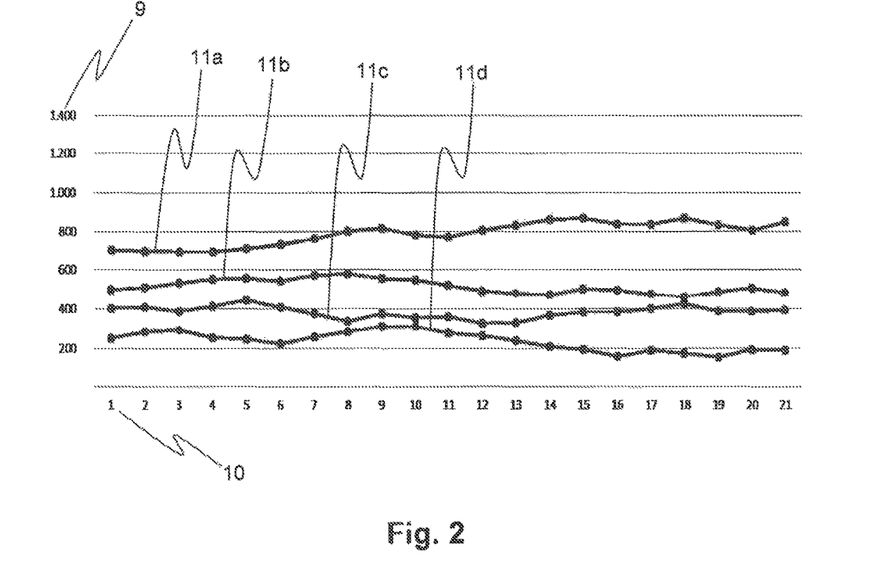

FIG. 2 shows a diagram of available resource loads 11a-d from four first receiver units 5a, 5b, 5c and 5d. The data rate 9 with a value range of 0 kbit/s to 1400 kbit/s is plotted on the vertical axis. A time interval 10 is indicated on the horizontal axis. In this example, the time interval of 0 to 21 is plotted. For example, the time interval represents seconds (of course, other time divisions are also possible). In this case, the diagram would show the available resources 11a-d of the first receiver units in a period of 21 seconds.

The four first receiver units 5a, 5b, 5c and 5d feature, as shown in FIG. 2, the highest available resource load 11a or 11b or 11c or 11d, as the case may be, at any time in the diagram. The available resource load 11a, in particular its bandwidth, is approximately in the range of 700 kbit/s to 900 kbit/s. The respective other first receiver units feature less available resource loads 11b-d, which fluctuate with time.

Figure 3:
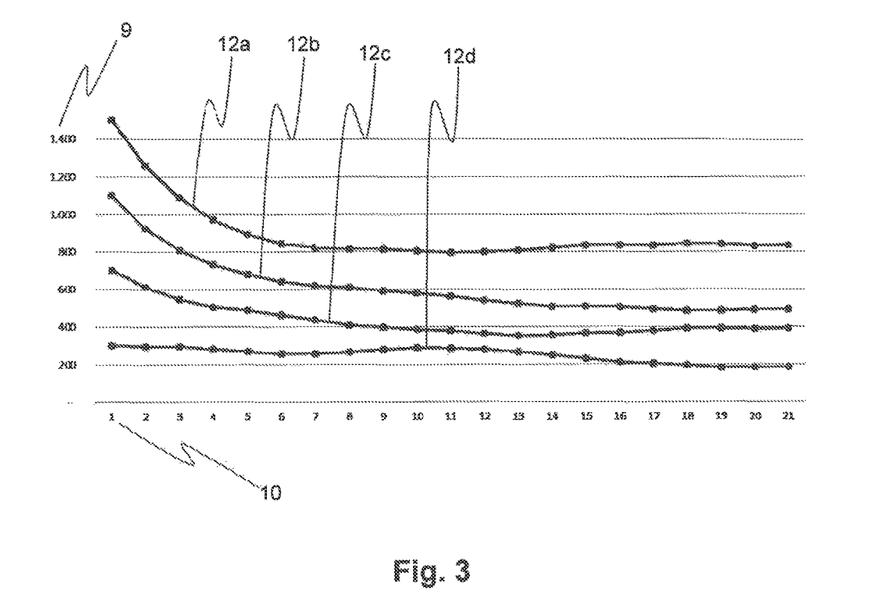

FIG. 3 shows a diagram of the data rates of the adjusted outgoing data streams. The same value ranges and variables as in FIG. 2 are assigned to the vertical axis and the horizontal axis. In addition, four outgoing data streams 12a-d are shown. Such four outgoing data streams 12a-d form a 1:1 allocation with the four first receiver units from FIG. 2—the outgoing data stream 12a is allocated to the first receiver unit with its resource load 11a, the outgoing data stream 12b is allocated to the first receiver unit 5b with its resource load 11b, etc.

It can also be seen in FIG. 3 that, at time "one," a predefined value is allocated to the respective outgoing data streams 12a-d. As can be seen, the predefined values for the outgoing data stream 12a are 1500 kbit/s, for the outgoing data stream 12b are 1100 kbit/s, for the outgoing data stream 12c are 700 kbit/s, and for the outgoing data stream 12d are 300 kbit/s. Thus, the outgoing data stream 12d features the worst quality. This is apparent from the fact that, for example, the resolution or the color depth (in the case of a video conference) is lower than with the other data streams.

In accordance with FIG. 2, an iterative adjustment of the respective outgoing data streams 12a-d to the available resource loads 11a-d of the first receiver units 5a, 5b, 5c and 5d from FIG. 2 is carried out. This method is explained using the example of the outgoing data stream 12a and the resource load 11a of the corresponding first receiver unit 5a. For the other outgoing data streams 12b-d and the resource loads 11b-d of the other first receiver units 5b-d, the method is preferably analogous.

As already mentioned, the outgoing data stream 12a commences with a predefined value for the bandwidth of 1500 kbit/s. However, at this point in time (point in time "1" in FIG. 2), the resource load 11a of the corresponding first receiver unit offers only one bandwidth (the bandwidth is not to be restricted here, but should only be shown as an example) of 700 kbit/s. On the basis of such information 8a, in several control steps, the server unit 1 iteratively adjusts the data rate of the outgoing data stream 12a "downward" to the available resource load 11a. This adjustment is carried out, for example, with the method of exponential smoothing described above, with which the server unit 1 precalculates the expected resource load 11a of the corresponding first receiver unit on the basis of the information 8a and, accordingly, subjects the data rate of the outgoing data streams 12a to a controlling adjustment to such first receiver units 5a. At the beginning, this occurs more rapidly or with larger value adjustments than at a later point in time, as the data rates have already been approximated more closely. An adjustment of the data rate of the outgoing data stream 12a takes place successively in a plurality of control steps on the basis of the information 8a, provided continuously or discontinuously by the first receiver unit 5a with the resource load 11a of the server unit 1, regarding the bandwidth currently available for this first receiver unit 5a. This control of the data rate adjustment takes place, for example, at each point in time marked in FIGS. 2 and 3 (in the present exemplary case, at 21 points in time).

Towards the end of the time interval shown in FIGS. 2 and 3, finally, both bandwidths 11a-d and 12a-d then feature approximately the same value. For example, the available resource load 11a or bandwidth, as the case may be, of the specified first receiver unit 5a is approximately 850 kbit/s, and the data rate of the outgoing data stream 12a is approximately 830 kbit/s (see respective points in time "21" in FIGS. 2 and 3).

Figure 4:
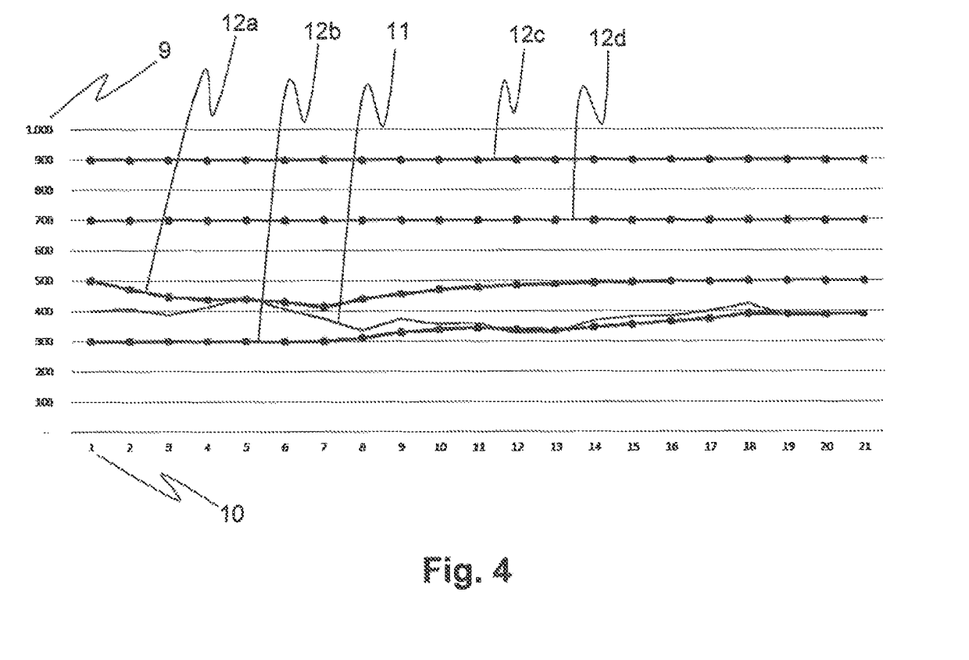

FIG. 4 shows a diagram with four outgoing data streams 12a-d and an available resource load 11 or bandwidth of a first receiver unit. The vertical and horizontal axes are again assigned with the same variables as in FIGS. 2 and 3. No receiver unit is assigned to the two outgoing data streams 12c and 12d with a predefined value of 900 kbit/s or 700 kbit/s, as the case may be. Such data streams 12c and 12d are therefore not adjusted, but remain constant at the respective predefined value. The outgoing data stream 12a features a data rate of 500 kbit/s and the outgoing data stream 12b features a data rate of 300 kbit/s. The specified first receiver unit has an available resource load 11 or bandwidth (once again only as an example of a resource) of 400 kbit/s, which initially increases slightly and thus features a fluctuating resource load. The server unit 1 calculates the differences of the currently available resource loads 11 or bandwidths of each first receiver unit at each outgoing data stream 12a-d. The outgoing data stream 12a-d that features the smallest difference from the available resource load 11 or bandwidth of the corresponding first receiver unit is then selected by the server unit 1. In other words, this means that the outgoing data stream 12a-d that is closest to the available resource load 11 or bandwidth of the respective first receiver unit 1 is selected. In the diagram of FIG. 4, the outgoing data stream 12a is initially closest to the currently available resource load 11 or bandwidth, as the case may be, of the first receiver unit. As such, the server unit 1 adjusts the outgoing data stream 12a "downward." However, from the point in time "8," the outgoing data stream 12b is closer to the available resource load 11 or bandwidth, as the case may be, of the first receiver unit. From this point in time, the outgoing data stream 12b is adjusted to the available resource load 11 of this first receiver unit. The outgoing data stream 12a thereupon adjusts once again to its predefined value of 500 kbit/s.

By means of the invention, it is possible to provide a significantly better video quality to both active and passive participants in a video conference.

This invention is not limited to the illustrated and described embodiments. Variations within the scope of the claims, just as the combination of characteristics, are possible, even if they are illustrated and described in different embodiments.

LIST OF REFERENCE SIGNS

1 Server unit
2a-d Incoming data stream
3a-d Transmitter unit
4a-d Outgoing data stream
5a-d First receiver unit
6 Additional, second receiver unit
7 Mosaic image
8a-d Information regarding resource load
9 Data rates
10 Time interval
11a-d Available resource load from a first receiver unit
12a-d Data rate of the outgoing data stream
13a-d Information sent back

The invention claimed is:

1. A method for adjusting data streams to respective resource loads of a plurality of first receiver units in audio-based and video-based real-time communication, said data streams to be transmitted during a video conference to the plurality of first receiver units, each respective resource load of each respective first receiver being variable over time, the method comprising the following steps:
a server unit receives an incoming data stream from each of a plurality of transmitter units, each respective transmitter unit being integrated with a respective first receiver unit in a respective participant device that is participating in the video conference;
the server unit generates from such incoming data streams a plurality of outgoing data streams, wherein each of the plurality of outgoing data streams has a compressed data rate;
from a first one of the plurality of first receiver units, the server unit receives information about the existing resource load of the respective receiver unit at a first point in time;
based on the information received by the server unit from the first one of the plurality of first receiver units about the existing resource load of the respective first receiver unit, the server unit performs on a first one of the plurality of outgoing data streams an adjustment of the compressed data rate of the first one of the outgoing data streams; and
the server unit sends through transmission channels to the respective first one of the plurality of first receiver units the first one of the outgoing data streams with the compressed data rate adjusted based on the information about the existing resource load of the respective first receiver unit at the first point in time;
wherein for use in a video conference with a plurality of active and passive participants, wherein there is a maximum number P of active participants, and the number N of active participants with first receiver units that are to be provided with data streams is less than the maxi mu number P, the method includes the following first functionality;
the server unit generates at least N outgoing data streams, with corresponding N transmission channels;
from the N outqoing data streams the server unit performs a 1:1 allocation between the outgoing data streams and the participant devices of the N participants;
the server unit subjects each of the N outgoing data streams to a controlling adjustment to the resource load of the respective first receiver unit to which the respective N outgoing data stream is allocated; and
the server unit sends through transmission channels to each respective first receiver unit the allocated outgoing data stream with the compressed data rate adjusted based on the information about the existing resource load of the respective first receiver unit at the first point in time; and
wherein passive participants in the video conference are connected via a plurality of second receiver units; and
the server unit allocates to each of the plurality of second receiver units the data stream that is closest to the resource load of the respective second receiver unit.

* * * * *

UNITED STATES PATENT AND TRADEMARK OFFICE
CERTIFICATE OF CORRECTION

PATENT NO.        : 10,178,145 B2
APPLICATION NO.   : 15/518372
DATED             : January 8, 2019
INVENTOR(S)       : Andreas Kroepfl Page 1 of 1

It is certified that error appears in the above-identified patent and that said Letters Patent is hereby corrected as shown below:

In the Claims

Claim one, Column 16, Line 33, currently reads "from the N outqoing data streams" line should read "from the N outgoing data streams"

Signed and Sealed this
Fifth Day of March, 2019

Andrei Iancu
*Director of the United States Patent and Trademark Office*